Figure 1:
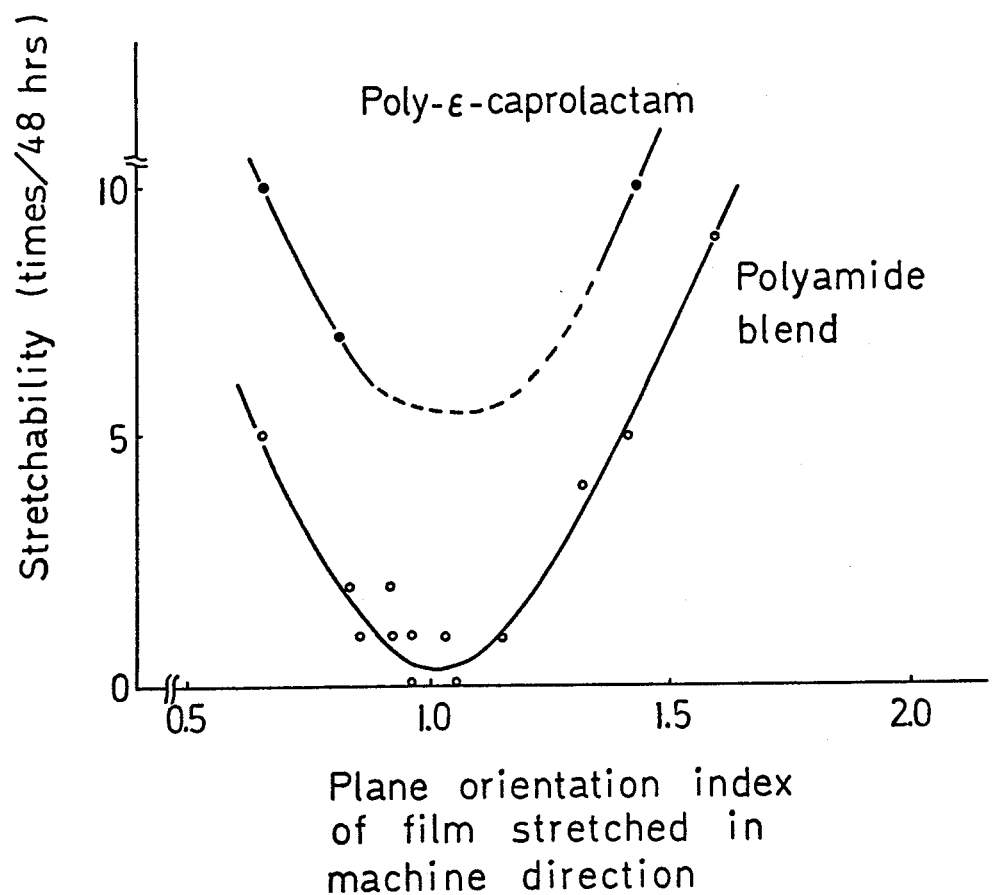

United States Patent [19]

Etou et al.

[11] 4,098,860
[45] Jul. 4, 1978

[54] PRODUCTION OF BIAXIALLY DRAWN FILM OF POLYAMIDE BLEND

[75] Inventors: Yoshitaka Etou; Mikio Matsuoka; Shizuo Matsumoto; Takamichi Zoda; Katsumi Gunji, all of Inuyama; Toshihiko Ohta, Otsu; Kazuo Tamaki, Otsu; Koichi Matsunami, Otsu; Tetsushi Murakami, Otsu, all of Japan

[73] Assignee: Toyo Boseki Kabushiki Kaisha, Osaka, Japan

[21] Appl. No.: 711,613

[22] Filed: Aug. 4, 1976

[30] Foreign Application Priority Data

Oct. 11, 1975 [JP] Japan .................. 50/122600
Feb. 27, 1976 [JP] Japan .................. 51/21703

[51] Int. Cl.² .............................................. B29D 7/24
[52] U.S. Cl. ............................ 264/171; 260/857 TW; 264/210 R; 264/289; 264/290 N
[58] Field of Search .......... 264/289 R, 290 N, 210 R, 264/171; 260/857 TW

[56] References Cited

U.S. PATENT DOCUMENTS

| 3,637,906 | 1/1972 | Parathoën | 264/289 |
| 3,652,759 | 3/1972 | Schlemmer et al. | 264/289 |
| 3,843,479 | 10/1974 | Matsunami et al. | 264/289 R |
| 3,968,071 | 7/1976 | Miyamoto et al. | 260/857 TW |

OTHER PUBLICATIONS

Macromolecular Chemie-, 33, 1, 1959-Kinoshita, pp. 1-20.

Primary Examiner—Jeffery R. Thurlow
Attorney, Agent, or Firm—Birch, Stewart, Kolasch and Birch

[57] ABSTRACT

A process for preparing a biaxially stretched film of polyamide blend, which comprises (1) extruding a polyamide blend in melt to make an unstretched film and (2) stretching the unstretched film first in a machine direction with a stretch speed of about 40,000 to 60,000,000 %/minute in a draw ratio of about 2 to 6 and then in a transverse direction with a stretch speed of about 500 to 100,000 %/minute in a draw ratio of about 2 to 6, or (2') stretching the unstretched film first to make a uniaxially stretched film having a plane orientation index of about 0.6 to 1.5 and then stretching the uniaxially stretched film in a direction being substantially at a right angle to the direction at the previous stretching, said polyamide blend comprising an aliphatic polyamide and a polyamide containing in the molecule at least about 70 mol % of the repeating units constituted with metaxylylenediamine or its mixture with paraxylylenediamine (of which the content is not more than about 30 mol % based on the combined amount of metaxylylenediamine and paraxylylenediamine) and at least one α,ω-aliphatic dicarboxylic acid having 6 to 10 carbon atoms in a proportion of about 97 : 3 to 80 : 20 by weight.

8 Claims, 1 Drawing Figure

PRODUCTION OF BIAXIALLY DRAWN FILM OF POLYAMIDE BLEND

The present invention relates to production of a biaxially drawn film of polyamide blend. More particularly, it relates to production of a stretched film of polyamide blend by sequential biaxial stretching of an unstretched film of polyamide blend containing an aliphatic polyamide as the main component.

It is well known that biaxial stretching of an unstretched film of a thermoplastic polymer in directions being at a right angle to each other generally affords a stretched film excellent in physical properties such as mechanical strength and gas-barrier property and that such biaxial stretching may be effected by either simultaneous biaxial stretching or sequential biaxial stretching. It is also well known that an aliphatic polyamide such as nylon 6 or nylon 6.6 is difficult to afford a uniformly stretched film by sequential biaxial stretching (Japanese Patent Publication No. 9399/1968). As to simultaneous biaxial stretching, it is difficult to obtain a film with low unevenness in thickness by the inflation process in which air is blown into a film in a tube form on stretching. Further, by the process in which simultaneous biaxial stretching is effected in a tenter while holding with clips, an expensive, complicated apparatus is required and the speed of the film-formation is hardly raised.

Under these circumstances, various methods for sequential biaxial stretching of an unstretched film of polyamide have been hitherto proposed in order to overcome the said drawbacks. For example, Japanese Patent Publication No. 2195/1962 proposes the incorporation of monomers or oligomers into polyamides constituted with them and the sequential biaxial stretching of an unstretched film of the resulting mixture. By such method, however, various troubles such as adhesion of the additives to rollers are caused on the film-formation, and the produced film is deteriorated in strength and size-stability and possesses increased gas-permeability and electric conductivity because of the presence of the monomers and oligomers. There have been further proposed the following methods: stretching in one direction and then rolling in the vertical direction (Japanese Patent Publications Nos. 5986/1963 and 12496/1964); preventing crystallization of a film on roll-stretching (Japanese Patent Publication No. 3195/1972); providing a longitudinally stretched film with grooves (Japanese Patent Publication No. 8868/1973); etc. These methods have each various disadvantages and are not satisfying ones.

As the result of the extensive study, it has now been completed a process for preparing a polyamide film by sequential biaxial stretching without any drawback as seen in the conventional methods.

According to the present invention, there is provided a process for preparing a biaxially stretched film of polyamide blend, which comprises extruding a polyamide blend in melt to make an unstretched film and stretching the unstretched film first in a machine direction with a stretch speed of about 40,000 to 60,000 %/minute in a draw ratio of about 2 to 6 and then in a transverse direction with a stretch speed of about 500 to 100,000 %/minute in a draw ratio of about 2 to 6, said polyamide blend comprising an aliphatic polyamide and a polyamide containing in the molecule at least about 70 mol % of the repeating units constituted with metaxylylenediamine or its mixture with paraxylylenediamine (of which the content is not more than about 30 mol % based on the combined amount of metaxylylenediamine and paraxylylenediamine) and at least one α,ω-aliphatic dicarboxylic acid having 6 to 10 carbon atoms (hereinafter referred to as "xylylene-containing polyamide") in a proportion of about 97 : 3 to 80 : 20 by weight.

As the aliphatic polyamide, there may be used any aliphatic polyamide which makes an alpha-form crystal (according to the classification as described in Macromol. Chem., 33, 1 (1959) by Kinoshita) such as nylon 4, nylon 6, nylon 9, nylon 11, nylon 6.6, nylon 6.10, nylon 10.10.

Examples of the xylylene-containing polyamide include homopolymers such as polymetaxylylene adipamide, polymetaxylylene pimelamide, polymetaxylylene suberamide, polymetaxylylene azelamide and polymetaxylylene sebacamide, copolymers such as metaxylylene/paraxylylene adipamide, metaxylylene/paraxylylene pimelamide, metaxylylene/paraxylylene suberamide, metaxylylene/paraxylylene azelamide and metaxylylene/paraxylylene sebacamide. There are also included copolymers of the monomeric constituents of the said homopolymers and copolymers with aliphatic diamines (e.g. hexamethylene diamine), alicyclic diamines (e.g. piperazine), aromatic diamines (e.g. p-bis(2-aminoethyl)benzene), aromatic dicarboxylic acids (e.g. terphthalic acid), lactams (e.g. -caprolactam), ω-aminocarboxylic acids (e.g. 7-aminoheptanoic acid), aromatic aminocarboxylic acids, (e.g. p-aminomethylbenzoic acid), etc. In case of the copolymers having paraxylylene diamine constituents, the amount of the paraxylylene diamine constituents should not be more than about 30 mol % based on the combined amount of the paraxylylene diamine and metaxylylene diamine constituents therein. Further, the constituent units produced from xylylene diamine and aliphatic dicarboxylic acids should be at least about 70 mol % in the molecule chain.

In the xylylene-containing polyamide, there is particularly include a block copolymer constituted with a diamine component selected from metaxylylene diamine or its mixture with paraxylylene diamine (of which the content is not more than about 30 mol % of the combined amount of metaxylylene diamine and paraxylylene diamine), a dicarboxylic acid component mainly consisting of an α,ω-aliphatic dicarboxylic acid having 6 to 10 carbon atoms and a polyether having a molecular weight of about 2,000 to 20,000 and having at least one terminal amino group and/or at least one terminal carboxyl group, the content of the polyether being about 0.2 to 10 % by weight (hereinafter referred to as "block polyetheramide").

Specific examples of the block polyetheramide are the copolymers constituted with the constituents of the polyamides such as homopolymers (e.g. polymetaxylylene adipammide, polymetaxylylene pimelamide, polymetaxylylene suberamide, polymetaxylylene azelamide, polymetaxylylene sebacamide, copolymers (e.g. polymetaxylylene/paraxylylene adipamide, polymetaxylylene/paraxylylene pimelamide, polymetaxylylene/paraxylylene suberamide, polymetaxylylene/paraxylylene azelamide, polymetaxylylene/paraxylylene sebacamide, and copolymers of the monomers constituting said homopolymers and copolymers with other monomers such as aliphatic diamines (e.g. hexamethylene diamine, 2,4,4-trimethylhexamethylene diamine), heterocyclic ring or atom-containing diamines (e.g.

piperazinebispropylamine, neopentyl glycol bispropylamine), aromatic diamines (e.g. p-bis(2-aminoethyl)benzene), α,ω-aliphatic dicarboxylic acids having 6 to 12 carbon atoms, aromatic dicarboxylic acids (e.g. terephthalic acid, isophthalic acid), lactams (e.g. ε-caprolactam), ω-aminocarboxylic acids (e.g. ε-aminocaproic acid, p-aminomethylbenzoic acid), and the constituents of the polyethers as illustrated below.

The polyether as the constituent of the polyetheramide may be any polyether having a molecular weight of about 2,000 to 20,000. Particularly preferred are those of the formula:

$$X(O-Y)_nO-X' \qquad [A]$$

wherein Y is an alkylene or cycloalkylene group having not more than 6 carbon atoms, X and X' are each an atom or a group having not more than 30 carbon atoms and may be selected from hydrogen, alkyl, aryl or aralkyl, among which alkyl, aryl and aralkyl is optionally substituted with —COOH, —COOR (in which R is an ester residue) or —NH$_2$, and at least one of X and X' is alkyl, aryl or aralkyl substituted with —COOH, —COOR or —NH$_2$ and n is an integer which can set the molecular weight of the polyether between about 2,000 and 20,000.

Specific examples of Y are —CH$_2$—,

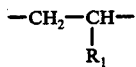

(in which R$_1$ is hydrogen or methyl),

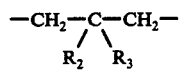

(in which R$_2$ and R$_3$ are each hydrogen or methyl), —(CH$_2$)$_4$—,

etc.

Specific examples of X and X' are hydrogen, alkyl such as methyl, ethyl, propyl, butyl, pentyl, hexyl, octyl, nonyl, lauryl or stearyl, aryl such as phenyl or biphenyl, alkylaryl such as methylphenyl, ethylphenyl, propylphenyl, butylphenyl, nonylphenyl or 2,4-dimethylphenyl, aralkyl such as phenylmethyl, phenylpropyl, phenylbutyl or phenyloctyl, amino-containing group such as aminoethyl, aminopropyl, 2-methylaminopropyl or aminoethylphenyl, carboxyl-containing group such as carboxymethyl, carboxyethyl, 2-carboxypropyl, carboxybutyl or carboxyphenyl, esterified carboxyl-containing group such as methoxycarbonylmethyl, ethoxycarbonylmethyl, methoxycarbonylethyl, ethoxycarbonylbutyl or methoxycarbonylphenyl, etc.

The polyether of the formula [A] may be optionally modified by introducing an ester group, an amide group, a heterocyclic group, etc. into the polyether molecular chain as the fundamental structure to form a block polyether.

Typical examples of such polyether are diethylamino-N-polyoxethane, piperazine-N,N'-polyethylene oxide, cyclohexylamino-N,N-polyethylene oxide, polyethylene glycol dipropylamine, polyproylene glycol dipropionic acid, polytetrahydrofuran diamine, polytetrahydrofuran/polyethylene oxide block copolymer dipropylamine, caprolactam-N- polyethylene oxide, m-aminophenol-ethylene oxide adduct, resorcinolethylene oxide adduct, aminothiophenol-ethylene oxide adduct, polyalkylene glycol tricyanurate, 2,4-N,N'-distearylpolyethyleneoxyamino-6-p-(sodium sulfophenylamino)-s-triazine, N-polyethyleneoxyalkyl-2-octadecylsuccinimide, 2-phenyl-3-polyoxyalkylene imidazole, etc.

In the block polyetheramide constituted with polyamide components, the polyether is usually dispersed as island components having a particle size of not more than about 10 μ as confirmed by microscopic observation.

The molecular weights of the aliphatic polyamide and the xylylene-containing polyamide are to be adjusted to such an extent that the blend of them shows an appropriate viscosity so as to make an even surface when its melt its extruded in film. However, excessively high viscosity is not favorable since the operation for extrusion is made difficult. Usually, their molecular weights are preferred to be so regulated as showing a relative viscosity of about 1.6 to 4.0 on extrusion in a melt state.

The polyamide blend may include, in addition to the said essential components (i.e. the aliphatic polyamide and the xylylene-containing polyamide), any additive such as polymers, antistatic agents, lubricants, anti-fogging agents, anti-blocking agents, stabilizers, ultraviolet light absorbers, dyestuffs and pigments.

The mixing of the aliphatic polyamide and the metaxylylene containing polyamide to be used in the invention may be effected by any appropriate procedure. In usual, these components in chip state are admixed by the aid of any blender such as a V-form blender, and the blend is then melted and shaped.

An unstretched film of polyamide blend may be prepared by a melt method such as the T-die method or the inflation method. This film is substantially non-oriented. When the film formation is effected by a melt method using a T-die, for example, the polyamide blend is heated to a temperature higher than the melting temperature thereof, extruded through the T-die into a film form and cooled with a roll or a liquid. The temperature of the roll or the liquid is desired to be kept below 80° C, preferably between 20° and 80° C, because the stretchability of the film is lowered with increase of the temperature.

The thus prepared unstretched film is subjected to sequential biaxial stretching with the stretch speed of said range, whereby an evenly stretched film is obtainable.

The term "stretch speed" indicates a stretch speed in average during stretching and is representable by the following equation:

Stretch speed = $d_1/d_2 \times 100 / t$
(%/min)

wherein $d_1$ and $d_2$ are respectively the thickness of the film before stretching and the thickness of the film after stretching and $t$ is the time (min) required for stretching.

In the present invention, the stretch speed in machine direction is to be from about 40,000 to 60,000,000 %/minute, preferably from about 100,000 to 30,000,000 %/minute. When the stretch speed is less than about 40,000 %/minute, uneven stretching or breaking may occur. When more than about 60,000,000 %/minute, much breaking will occur. The stretch speed in transverse direction is to be from about 500 to 100,000 %/minute, preferably from about 1,000 to 30,000 %/minute. When the stretch speed is less than about 500 %/minute, uneven stretching will occur with deterioration of the film in quality. When more than about 100,000 %/minute, breaking may be apt to occur.

In case of the content of the aliphatic polyamide in the unstretched film being more than about 97% by weight of the combined amount of the aliphatic polyamide and the xylylene-containing polyamide, the stretching particularly at the later stage (i.e. in transverse direction) is hardly effected evenly, and much breaking occurs during the stretching and/or the thickness of the resulting stretched film becomes uneven. In case of the content of the aliphatic polyamide being less than about 80% by weight, the physical properties of the resulting stretched film is much varied from those of a conventional stretched film made of the aliphatic polyamide alone. In other words, the pliability and the impact resistance at low temperature originated from the aliphatic polyamide is deteriorated.

The temperature at the stretching in machine direction may be usually above the glass transition point of the unstretched film and below about 130° C, preferably from about 50° to 90° C. When the stretching temperature is lower than the glass transition temperature, an extremely high stress is needed for accomplishment of the stretching, and sometimes the break of the film or the loss of clarity in the film occurs. Thus, the stretching with a high draw ratio becomes difficult. When the stretching temperature is higher than about 130° C, the subsequent stretching in transverse direction is made with great difficulty.

The temperature at the stretching in transverse direction may be ordinarily higher than that at the stretching in machine direction and lower than about 160° C. Preferred temperature is in the range between about 80° and 130° C. In case of the temperature being lower than that as adopted at the stretching in machine direction, even stretching becomes difficult, and the thickness of the stretched film is made uneven. In case of the temperature being higher than about 160° C, the stretched film having excellent physical properties is hardly obtainable.

At the stretching in machine direction and in transverse direction, the draw ratio is to be from about 2 to 6. In case of the draw ratio being less than about 2, the obtained film tends to possess stretching spots and to show unevenness in thickness. Besides, it becomes difficult to give to the film a sufficient orientation. In case of the draw ratio at the stretching in machine direction exceeding about 6, the subsequent stretching in transverse direction becomes difficult and the break of the film is produced. In case of the draw ratio at the stretching in transverse direction exceeding 6, the film is apt to be broken.

In another aspect of the present invention, there is provided a process for preparing a biaxially stretched film of polyamide blend, which comprises stretching an unstretched film of polyamide blend to make a uniaxially stretched film having a plane orientation index of about 0.6 to 1.5 and then stretching the uniaxially stretched film in a direction being substantially at a right angle to the direction at the previous stretching, said polyamide blend comprising the aliphatic polyamide and the xylylene-containing polyamide in a proportion of about 97 : 3 to 80 : 20 by weight.

For preparing the uniaxially stretched film having the said plane orientation index, the proportion of the aliphatic polyamide and the xylylene-containing polyamide in the polyamide blend, the condition for extrusion and the condition for uniaxial stretching may be appropriately set.

The important point herein is that the orientation character of α-form crystals of the aliphatic polyamide formed in the film after uniaxial stretching, particularly in machine direction, has a great influence on the stretchability in the vertical direction, particularly in transverse direction.

Up to the present time, the sequential biaxial stretching of aliphatic polyamides has encounered to extreme difficulty and therefore not been practised in the industrial scale. This is due to the fact that kink bands are readily formed on the stretching in transverse direction, which is carried out subsequently to the stretching in machine direction at the initial stage. Based on the thinking that, by regular arrangement to the film surface of the crystal lattice planes formed in the film stretched in machine direction which will be soon stretched in transverse direction, the formation of kink bands is facilitated and the stretchability in transverse direction is reduced, investigations have been carried out, and it has been confirmed that, in a film containing more than about 97% by weight of the aliphatic polyamide to be used in the invention and stretched in machine direction, the hydrogen bonded sheets of α-form crystals of the aliphatic polyamide are arranged regularly to the film surface to facilitate the formation of kink bands on the subsequent transverse stretching, which not only causes break of the film but also produces stretching spots whereby the obtained film is not uniform in the physical properties and its appearance is greatly deteriorated. It has been also confirmed that with increase of the mixing proportion of the xylylene containing polyamide exceeding 3% by weight, the regular arrangement of the crystal lattice planes of the film stretched in one direction, especially in machine direction, to the film surface is prevented to improve greatly the stretchability in vertical direction, especially in transverse direction, which permits the realization of the sequential biaxial stretching without adopting the specific processes described in Japanese Patent Publications Nos. 8868/1973 and 3195/1972 and Japanese Patent Publication (unexamined) No. 55679/1975.

The sequential biaxial stretching according to the invention will be hereinafter explained in detail. The explanation is concerned in the case where the stretching is effected first in machine direction and then in transverse direction, but this is also applicable to the sequential biaxial stretching where the stretching is effected first in transverse direction and then in machine direction.

As the result of further investigations on the above mentioned points, it has been confirmed that, depending on the mixing proportion of the xylylene containing polyamide in the polyamide blend of the invention and the combination of the cooling conditions at the extrusion of the melted polyamide blend into a film form (mainly the chill roll temperature) with the conditions in the subsequent stretching in machine direction (mainly the stretching temperature and the draw ratio), the plane orientation index indicating the orientation character to the film surface of α-form crystals of the aliphatic polyamide formed in the film stretched in machine direction is varied to a considerable extent within a range of about 0.5 to 2.5, and when the value comes close to about 1.0, the formation of kink bands is prevented to improve further the stretchability in the subsequent stretching in transverse direction.

FIG. 1 in the accompanying drawing is a graph showing a relationship between the plane orientation index of the film stretched in machine direction which is varied depending on the kind of the polyamide blend and the conditions in the film-formation (shown in Examples as hereinafter set forth) and the stretchability in transverse direction. From this Figure, it is understood that an industrially adoptable stretchability can be obtained when the plane orientation index is in the range of about 0.6 to 1.5, preferably about 0.8 to 1.2. Thus, the mixing proportion of the xylylene containing polyamide and the conditions in the film-formation are desired to be so determined that the plane orientation index comes in the said range.

The term "stretchability" herein used means the degree of facility on the transverse stretching of the film stretched in machine direction. It can be determined by transverse stretching of the film stretched in machine direction by the use of an apparatus usually employed in industrial production under the conditions designed for obtaining a biaxially stretched film with uniform quality. Judgement is made depending on the number of times of the film break per unit time.

As stated above, the incorporation of the xylylene-containing polyamide into the aliphatic polyamide is effective in obtaining a uniaxially stretched film which has a desired value of the plane orientation index. However, the increase of the content of the xylylene-containing polyamide over about 20% by weight is not favorable, since the pliability and the impact strength at low temperature originated in the aliphatic polyamide are decreased. The temperature for cooling the unstretched film formed by extruding the polyamide blend in melt is preferred to be set below about 80° C, particularly between about 20° and 60° C.

The resultant unstretched film is subjected to sequential biaxial stretching under the conditions hereinabove explained on the temperature for stretching, the draw ratio, the stretch speed, etc. The conditions at the initial stage (usually the stretching in machine direction) are to be set appropriately so as to make possible the obtainment of a uniaxially stretched film (usually a film stretched in machine direction) having a plane orientation index of about 0.6 to 1.5. Stretching at a temperature higher than about 130° C is usually not favorable, because the plane orientation index of the resulting uniaxially stretched film will exceed about 2.0 so that kink bands are readily formed at the subsequent stretching in transverse direction, whereby the stretchability is much decreased. On the other hand, the temperature lower than the glass transition point of the unstretched film is undesirable, since an extremely high stress is needed for accomplishment of the stretching and sometimes the break of the film or the loss of clarity in the film occurs. Thus, the stretching with a high draw ratio becomes difficult. Accordingly, a temperature above the glass transition point of the unstretched film and below about 130° C, particularly from about 50° to 90° C, is practically applicable for stretching.

At the stretching in machine direction, the draw ratio is favorable to be from about 2 to 6. In case of the draw ratio being less than about 2, the obtained film tends to possess stretching spots and to show unevenness in thickness. Besides, it becomes difficult to give to the film a sufficient orientation. In case of the draw ratio exceeding about 6, the plane orientation index becomes more than about 1.5 so that kink bands are apt to be produced on the subsequent stretching in transverse direction. Thus, the stretching in transverse direction is made difficult.

When the film stretched in machine direction and having a plane orientation index of about 0.6 to 1.5 is stretched in transverse direction, the temperature may be higher than that at the stretching in machine direction and lower than about 160° C, preferably between about 80 and 130° C. In case of the temperature being lower than that as adopted at the stretching in machine direction, an extremely large stretching stress is required for stretching the film stretched in machine direction, as already crystallized and oriented in such direction, in the vertical direction to the oriented direction so that uniform stretching becomes difficult. Besides, the unevenness in the film thickness becomes large. On the other hand, when the temperature is higher than 160° C, flowing of the molecular chain at the non-crystallized part is caused by slip of the crystal surface formed in the film stretched in machine direction, so that a film with satisfying quality is not obtained. In case of the draw ratio at the stretching in transverse direction being less than about 2, the obtained film tends to possess stretching spots and to show unevenness in thickness. Besides, it becomes difficult to give to the film a sufficient orientation. In case of the draw ratio at the stretching exceeding about 6, the film is apt to be broken.

The stretch speed may be 40,000 %/minute to 60,000,000 %/minute, preferably 100,000 %/minute to 30,000,000 %/minute, in case of the stretching in machine direction, and 500 %/minute to 100,000 %/minute, preferably 1,000 %/minute to 30,000 %/minute, in case of the stretching in transverse direction.

With the said range of stretch speed, a film stretched in machine direction having a plane orientation index is obtainable, and such film can be uniformly stretched in transverse direction.

As to the stretching apparatus with which the sequential biaxial stretching is carried out according to the present invention, there is no particular restriction. From the practical and industrial viewpoint, however, the use of a roll stretching machine for stretching in machine direction and of a tenter for stretching in transverse direction is recommendable.

The biaxially stretched film of polyamide blend prepared as above has good properties by itself. When desired, it may be further stretched in machine or transverse direction in order to enhance the physical properties in a specific direction.

For providing the film after stretching with a more improved thermal stability, it may be optionally subjected to heat treatment at a temperature about 5° C higher than the higher temperature of the temperatures at the stretching in machine and transverse directions and lower than the melting point of the film for a period of time not longer than about 5 minutes, preferably from about 5 to 60 seconds. During the heat treatment, the film may be maintained at the state of constant length, relax or elongation or their combination. As the result of such heat treatment, the crystallization degree of the film is increased, the distortion produced in the film at the stretching step is eliminated and the mechanical property and the size stability of the film becomes better.

The thus obtained film has an excellent crystallinity and a balanced characteristic in machine and transverse directions.

Insofar as the purpose of the present invention is not prevented, the process of the invention may be applied not only to an unstretched film of single layer but also to a composite film of which at least one layer consists of an unstretched film as used in the invention. For instance, an unstretched laminated film obtained by co-extruding the polyamide blend of the invention and any other polymer may be stretched sequentially and biaxially according to the process of the invention. Further, for instance, an unstretched film of the polyamide blend of the invention may be first stretched in machine direction and, after being coated by any polymer, further stretched in transverse direction.

According to the process of the present invention, a biaxially stretched film of an aliphatic polyamide can be easily and industrially prepared by the use of such polyamide as a blend with the xylylene-containing polyamide.

In general, the sequentially and biaxially stretched film of polyamide blend prepared by the process of the invention has a thickness of about 1 to 1,000 $\mu$ (particularly of about 10 to 500 $\mu$), a break strength of about 15 to 30 kg/mm$^2$ and an impact strength of about 6 to 15 kg.cm/25$\mu$. Such film is provided with various advantageous properties such as excellent transparency, mechanical strength, pliability, gas barrier property, thermal resistance and impact strength at low temperature. Further, it is more excellent in tensile strength and precision of thickness than a conventional film obtained by simultaneous biaxial stretching.

Accordingly, the biaxially stretched film of the present invention is useful as a packaging material for various materials such as cooked foods, meat products, marine products, vegetables and fruits, freezed products, etc. It is also useful as an industrial material or an electrical material or for vacuum evaporation of metals. When desired, any processing operation such as surface treatment, coating, lamination or printing may be applied to the film.

For well understanding the invention, detailed explanation will be hereinafter made on several technical terms employed in this specification and on the procedures of determination of the physical properties described in the following Examples.

(1) Method for distinguishing the aliphatic polyamide forming α-form crystals:

The aliphatic polyamide to be tested is melt-crystallized at a temperature between the melting temperature of the polyamide and the temperature lower than the melting temperature by 30° C, the obtained solid product is subjected to the X-ray analysis at room temperature and the formation of α-form crystals is examined.

(2) The plane orientation index of uniaxially stretched film:

In the α-form crystals of the aliphatic polyamide formed in the uniaxially stretched film, the molecular chain axis is arranged in the direction of uniaxial orientation, and further the hydrogen bonded sheet shows a biaxial orientation parallel or vertical to the film surface and a uniaxial orientation equidirected to the film surface depending on the conditions of the film-formation. For simply representing these orientation states, a plane orientation index is defined by the following equation using the two strong diffraction intensitives from the equatorial plane of the α-form crystals of the aliphatic polyamide obtained by irradiating the uniaxially stretched film with X-ray vertically:

$$\text{Plane orientation index} = K \times \frac{\text{Diffraction intensity from equatorial plane having a peak at a spacing of 4.3 to 4.5 A}}{\text{Diffraction intensity from equatorial plane having a peak at a spacing of 3.6 to 3.8 A}} \quad (1)$$

In this equation, the constant K is a reverse numeral of the second term of the equation (1) in the uniaxially oriented specimen and can be readily determined from the diffraction intensity of each crystal plane subjected to crystal analysis or the measured value in the uniaxially oriented specimen (for instance, fiber specimen). In case of nylon 6, the value of K is 1.62 and in the case of nylon 6.6, the value is 1.72. The physical meaning of the plane orientation index is as follows: when its value comes close to 1.0, a uniaxial orientation is indicated; when the value is larger than 1.0, a biaxial orientation where the hydrogen bonded sheet is parallel to the film surface is indicated; and when the value is smaller than 1.0, a biaxial orientation where the hydrogen bonded sheet is vertical to the film surface is indicated.

(3) Procedure for determining the plane orientation index:

Since, in the uniaxially stretched film taken out from the operation step, there are present, in addition to α-form crystals, meso-states (for instance, smectic hexagonal state) which are converted into α-form crystals under heating and show thereby a biaxial orientation, the estimation should be effected including these factors. The determination of the plane orientation index is therefore carried out using as a specimen the film stretched in machine direction taken out from the operation step and subjected to treatment with boiling water for 30 minutes in a state of original length-fixation. The X-ray determination is effected by the aid of Rota-Flex manufactured by Rigaku Denki K.K. under CuKα-ray, as the X-ray source, obtained by filtering with Ni the X-ray generated under the conditions of a tube voltage of 45 KV and a tube current of 70 mA. For detection of the X-ray intensity, a scintillation counter is employed. The slit system is as follows: divergence slit, 1°/6 × 1°/6; scattering slit, 1°/6; receiving slit, 0.3 mm.

The following is an explanation on the operation for analysis of the plane orientation index of the film stretched in machine direction. Firstly, the surface of the film stretched in machine direction after treatment with boiling water is irradiated with X-ray vertically and the curve of X-ray diffraction intensity in the equatorial direction is determined by the permeation method under the condition: $2\theta = 13° - 33°$. From the curve, the X-ray diffraction intensity curve from the non-crystallized part is eliminated, and the integral intensities of the two strong diffractions from the equatorial plane of α-form crystals of the aliphatic polyamide, i.e. the ones having a peak at a spacing of 4.3 to 4.5 A and of 3.6 to 3.8 A, respectively, are measured. From the thus measured values, calculation is made by the equation (1) to obtain the plane orientation index. The integral intensity is determined by drawing the intensity curve of low angle side to the peak position in case of the diffraction from the equatorial plane with a spacing of 4.3 to 4.5 A or of high angle side to the peak position in case of the diffraction from the equatorial plane with a spacing of 3.6 to 3.8 A symmetrically to each peak position and measuring the produced area. As the above mentioned X-ray diffraction intensity curve from the non-crystallized part, the one in the direction having an angle of about 45° to the equatorial direction which is not influenced by the diffraction from the crystals is employed.

(4) Stretchability:

The film formed is stretched for 24 or 48 hours under the conditons described in the following Examples and the number of times of film break caused on the stretching is employed as the criterion for the estimation.

(5) Relative viscosity ($\eta_{rel}$):

The determination is effected using 96% sulfuric acid under a concentration of 1 g/dl at 25° C by the aid of Ostwald's viscosimeter.

(6) Melting point; Glass transition temperature:

Measurement is made by the use of a differential calorimeter with a temperature elevation of 20° C/mm.

(7) Haze:

Determination is effected by the aid of a hazeometer of S-type manufactured by Toyo Seiki K.K., and from the values of the total amount of permeating light (A) and the amount of diffused light (A.B), the calculation is made by the following equation:

$$\text{Haze} = (A.B)/A \times 100\ (\%)$$

(8) Tensile strength at break; Elongation at break; Young's modulus:

Determination is effected according to ASTM-D 882 in the machine and transverse directions using a specimen of 50 mm in length and 10 mm in width by the aid of a largesized Tensilon UTM-3 manufactured by Toyo Sokki K.K. under a tensile velocity of 100 mm/min. The Young's modulus is obtained by calculation from the initial inclination of the stress-distortion curve.

(9) Impact strength:

Determination is effected by the aid of a film impact tester manufactured by Toyo Seiki K.K. under atmosphere of 20° and −20° C.

(10) Oxygen-permeability:

Determination is effected according to ASTM-D 1434-58 by the aid of a duplex gas-permeability-determining apparatus manufactured by Rika Seiki Kogyo K.K. at 20° C under a relative humidity of 0%.

(11) Pinhole resistance:

A round film of 15 cm in diameter is bound loosely at the end of a glass tube of 10 mm in diameter forming a bag-like shape, and a pressure of 0.2 kg/cm² and vacuum are alternately applied to the glass tube with a rate of 10 times/minutes. The pinhole resistance is represented by the times until which a pinhole is formed on the film.

EXAMPLE 1

Poly-ε-caprolactam ($\eta_{rel}$ = 3.0) as the aliphatic polyamide and polymetaxylylene/paraxylylene adipamide (metaxylylene diamine/paraxylylene diamine = 99/1 by mol; $\eta_{rel}$ = 2.2) as the xylylene containing polyamide are admixed in a chip state in a proportion as shown in Table 1. The mixture is heated at 260° C and melt-extruded through a flat die onto a chill roll to obtain an unstretched film having a thickness of about 175 μ. The unstretched film is sequentially and biaxially stretched under the conditions as shown in Table 1 to give a biaxially stretched film having the physical properties as shown in Table 2.

In this Example as well as Examples 2 and 3 and Comparative Examples 1 to 3, stretchability is judged on the times of break produced in the manufacture of a biaxially stretched film by the stretching process for 24 hours according to the following criteria: not more than 3 times, good; more than 10 times, not good.

COMPARATIVE EXAMPLE 1

The same poly-ε-caprolactam as used in Example 1 is heated at 260° C and melt-extruded through a flat die onto a chill roll to obtain an unstretched film, which is then biaxially stretched under the conditions as shown in Table 1 (Comparative Example 1-3).

A mixture of the same poly-ε-caprolactam as used in Example 1 and the same polymetaxylylene/paraxylylene adipamide as used in Example 1 in a proportion of 98 : 2 by weight is melt-extruded and the resulting unstretched film is biaxially stretched in the same manner as above (Comparative Example 1-2).

A mixture of the same poly-ε-caprolactam as used in Example 1 and the same polymetaxylylene/paraxylylene adipamide as used in Example 1 in a proportion of 75 : 25 by weight is melt-extruded and the resulting unstretched film is biaxially stretched in the same manner as above (Comparative Example 1—1).

The physical properties of the biaxially stretched films as prepared above are shown in Table 2.

As understood from Table 1, the films of Comparative Examples 1-3 and 1-2 are inferior in stretchability. The film of Comparative Example 1—1 is good in stretchability but inferior in pliability, impact strength at low temperature and pinhole resistance.

Table 1

| | Polymer composition (% by weight) | | Stretching in machine direction | | | Stretching in transverse direction | | | |
|---|---|---|---|---|---|---|---|---|---|
| No. | A*1) | B*2) | Temperature (° C) | Draw ratio | Stretch speed (%/min) | Temperature (° C) | Draw ratio | Stretch speed (%/min) | Stretchability |
| Example 1-1 | 80 | 20 | 65 | 3.5 | 7,000,000 | 105 | 3.7 | 2,000 | Good |
| Example 1-2 | 90 | 10 | 65 | 3.5 | 7,000,000 | 105 | 3.7 | 2,000 | Good |
| Example 1-3 | 95 | 5 | 60 | 3.5 | 7,000,000 | 105 | 3.7 | 2,000 | Good |
| Comparative Example 1-1 | 75 | 25 | 70 | 3.5 | 7,000,000 | 105 | 3.7 | 2,000 | Good |
| Comparative Example 1-2 | 98 | 2 | 58 | 3.5 | 7,000,000 | 105 | 3.7 | 2,000 | Not good (TD) |
| Comparative Example 1-3 | 100 | 0 | 70 | 3.5 | 7,000,000 | 105 | 3.7 | 2,000 | Not good (TD) |

Note:
*1)A: Nylon 6
*2)B: Metaxylylene-containing polyamide
TD, transverse direction.

Table 2

| No. | Thickness (%) | Tensile strength at break (kg/mm$^2$) MD | Tensile strength at break (kg/mm$^2$) TD | Elongation at break MD | Elongation at break TD | Initial Young's modulus (Kg/mm$^2$) MD | Initial Young's modulus (Kg/mm$^2$) TD | Haze (%) | Impact strength (kg.cm) 20° C | Impact strength (kg.cm) −20° C | Pinhole resistance time |
|---|---|---|---|---|---|---|---|---|---|---|---|
| Example 1-1 | 13 | 22.6 | 22.8 | 103 | 103 | 273 | 262 | 2.5 | 7.5 | 4.5 | More than 1000 |
| Example 1-2 | 13 | 22.5 | 23.2 | 105 | 110 | 258 | 260 | 2.3 | 7.8 | 5.0 | More than 1000 |
| Example 1-3 | 13 | 23.0 | 22.5 | 108 | 105 | 240 | 235 | 2.3 | 8.2 | 5.1 | More than 1000 |
| Comparative Example 1-1 | 13 | 22.5 | 18.0 | 97 | 100 | 312 | 300 | 2.5 | 6.0 | 3.1 | 600 |
| Comparative Example 1-2 | 13 | 23.2 | 23.5 | 110 | 110 | 220 | 220 | 1.5 | 9.0 | 5.2 | More than 1000 |
| Comparative Example 1-3 | 13 | 23.0 | 23.5 | 110 | 108 | 212 | 220 | 1.3 | 9.0 | 5.3 | More than 1000 |

Note: MD, machine direction; TD, transverse direction.

EXAMPLE 2 AND REFERENCE EXAMPLE 1

A mixture of poly-ε-caprolactam ($\eta_{rel} = 2.8$) as the aliphatic polyamide and polymetaxylylene adipamide ($\eta_{rel} = 2.1$) as the xylylene-containing polyamide in a proportion of 85 : 15 by weight is heated at 260° C and melt-extruded by the aid of an extruder having a T-die onto a chill roll to give an unstretched film of 200 μ in thickness. The unstretched film is sequentially and biaxially stretched under the conditions as shown in Table 3 with draw ratios of 3.5 in machine direction and of 3.7 in transverse direction and stretch speeds of 6,000,000%/minute in machine direction and of 3,000%/minute in transverse direction.

The results are shown in Table 3.

Table 3

| No. | Temperature (° C) Stretching in machine direction | Temperature (° C) Stretching in transverse direction | Stretchability |
|---|---|---|---|
| Example 2-1 | 65 | 105 | Good |
| Reference Example 1-1 | 65 | 60 | Not good (TD) |
| Reference Example 1-2 | 65 | 170 | Not good (TD) |
| Reference Example 1-3 | 135 | 140 | Not good (MD) |
| Reference Example 1-4 | 35 | 100 | Not good (MD) |

Note: TD, transverse direction, MD, machine direction.

EXAMPLE 3 AND COMPARATIVE EXAMPLE 2

As in Example 2, an unstretched film of 200 μ thick is prepared, and this film is sequentially and biaxially stretched at 65° C with a draw ratio of 3.5 in machine direction and then at 105° C with a draw ratio of 3.7 in transverse direction under the conditions as shown in Table 4 where the results are also shown.

As understood from the results, the stretchability of the film is not good in Comparative Example where the stretch speeds are not within the ranges as adopted in the process of the invention.

Table 4

| No. | Stretch speed (%/min) Stretching in machine direction | Stretch speed (%/min) Stretching in transverse direction | Stretchability |
|---|---|---|---|
| Example 3-1 | 45,000 | 3,000 | Good |
| Example 3-2 | 7,000,000 | 2,000 | Good |
| Comparative Example 2-1 | 30,000 | 400 | Not good (TD) |
| Comparative Example 2-2 | 70,000,000 | 110,000 | Not good (MD) |

Note: TD, transverse direction, MD, machine direction.

EXAMPLE 4

Poly-ε-caprolactam ($\eta_{rel} = 3.1$) as the aliphatic polyamide and polymetaxylylene/paraxylylene adipamide (metaxylylene diamine/paraxylylene diamine = 99/1 by mol; $\eta_{rel} = 2.1$) as the xylylene-containing polyamide are admixed in a chip state in a proportion as shown in Table 5. The mixture is heated at 275° C and melt-extruded by the aid of an extruder of 60 mm in diameter having a T-die onto a chill roll kept at a designed temperature as shown in Table 5 for cooling to obtain an unstretched film having a thickness of about 210 μ and a width of 25 cm. The unstretched film is then guided to a longitudinal stretching machine comprising multiple rolls being 110 mm in roll diameter and 700 mm in width at a velocity of 3 m/min and stretched in machine direction between the rolls with different peripheral speeds under the conditions shown in Table 5. Then, the film is guided into a transverse stretching tenter being about 3 m in width and about 11 m in length and stretched at 95° C in a direction vertical to the lengthwise direction of film with a proportion of 3.7. The plane orientation index of the film stretched in machine direction and the transverse stretchability are shown in Table 5.

In this Example as well as Example 7 and Comparative Example 3, stretchability is represented by the times of break at the stretching in transverse direction during the manufacture of a biaxially stretched film for 48 hours.

COMPARATIVE EXAMPLE 3

Using the same poly-ε-caprolactam as in Example 4, an unstretched film is prepared and then stretched in machine direction by the aid of the same extruder and film stretching apparatus as in Example 4 under the conditions shown in Table 6. Then, the transverse stretching is effected in the same manner as in Example 4. The results are shown in Table 6.

FIG. 1 of the accompanying drawing is a graph showing the relationship between the stretchability and the plane orientation index of the film stretched in machine direction based on the results as shown in Tables 5 and 6. From this Figure, it is understood that the stretchability is improved by admixing poly-ε-caprolactam with polymetaxylylene/paraxylylene adipamide and that an industrially adoptable stretchability can be obtained in the polyamide blend of the invention when the plane orientation index of the film stretched in machine direction is in the range of 0.6 to 1.5. The fact that the stretchability is improved by admixing with the xylylene-containing polyamide in spite of the equal value of the plane orientation index of the film stretched in machine direction in both cases of the aliphatic polyamide alone and the polyamide blend is probably attributable to decrease of the content of α-form crystals of the aliphatic polyamide. Especially in nylon 6, it is thinkable that incorporation of polymethxylylene/paraxylylene adipamide promotes the formation of γ-form crystals, and the content of α-form crystals is relatively reduced. Thus, in this latter polyamide blend, the presence of γ-form crystals of poly-ε-caprolactam which are not observed in a commercially available poly-ε-caprolactam film can be sometimes confirmed even in the film after sequential biaxial stretching.

Example 4 to obtain a film having a thickness of 15 μ which is subjected to heat treatment. The conditions in the film-formation and the stretching are as follows: temperature for melt extrusion of polymer, 285° C; temperature of chill roll, 20° C; temperature at stretching machine direction, 65° C; draw ratio at stretching in machine direction, 3.5; temperature at stretching in transverse direction, 100° C; draw ratio at stretching in transverse direction, 3.7. The film after the transverse stretching is subjected to heat treatment in a tenter at 200° C for 15 seconds in a state of 7% relaxation in transverse direction. The running velocity of the film at the entrance of the longitudinal stretching machine is 17 m/min.

The plane orientation index of the film stretched in machine direction is 0.96. Break of film at the transverse stretching step is caused only one time during 48 hours. The physical properties of the thus obtained film are shown in Table 7 in comparison with those of the typical poly-ε-caprolactam film obtained by simultaneous biaxial stretching.

Table 5

| No. | Mixing proportion of polymers Ny*1) | Mixing proportion of polymers XD*2) | Temperature of chill roll (° C) | Stretching in machine direction Temperature (° C) | Stretching in machine direction Draw ratio | Plane orientation index | Stretchability |
|---|---|---|---|---|---|---|---|
| A-132 | 80 | 20 | 20 | 75 | 3.5 | 1.41 | 5 |
| A-121 | 80 | 20 | 20 | 65 | 3.0 | 1.05 | 0 |
| A-122 | 80 | 20 | 20 | 65 | 3.5 | 1.15 | 1 |
| A-123 | 80 | 20 | 20 | 65 | 4.0 | 1.32 | 4 |
| A-241 | 80 | 20 | 80 | 90 | 3.0 | 1.91 | More than 10 |
| B-132 | 90 | 10 | 20 | 75 | 3.5 | 1.59 | 9 |
| B-122 | 90 | 10 | 20 | 65 | 3.5 | 0.85 | 1 |
| B-112 | 90 | 10 | 20 | 55 | 3.5 | 0.83 | 2 |
| B-121 | 90 | 10 | 20 | 65 | 3.0 | 0.92 | 1 |
| B-123 | 90 | 10 | 20 | 65 | 4.0 | 0.96 | 0 |
| C-132 | 95 | 5 | 20 | 75 | 3.5 | 2.19 | More than 10 |
| C-122 | 95 | 5 | 20 | 65 | 3.5 | 0.91 | 2 |
| C-112 | 95 | 5 | 20 | 55 | 3.5 | 0.65 | 5 |
| C-121 | 95 | 5 | 20 | 65 | 3.0 | 1.03 | 1 |
| C-123 | 95 | 5 | 20 | 65 | 4.0 | 0.96 | 1 |

Note:
*1)Ny: Poly-ε-caprolactam
*2)XD: Xylylene-containing polyamide

Table 6

| No. | Mixing proportion of polymers Ny*1) | Mixing proportion of polymers XD*2) | Temperature of chill roll (° C) | Stretching in machine direction Temperature (° C) | Stretching in machine direction Draw ratio | Plane orientation index | Stretchability |
|---|---|---|---|---|---|---|---|
| D-241 | 100 | 0 | 80 | 90 | 3.5 | 2.31 | More than 10 |
| D-242 | 100 | 0 | 80 | 90 | 3.0 | 2.00 | More than 10 |
| D-132 | 100 | 0 | 20 | 75 | 3.5 | 1.71 | More than 10 |
| D-122 | 100 | 0 | 20 | 65 | 3.5 | 0.81 | 7 |
| D-112 | 100 | 0 | 20 | 55 | 3.5 | 0.65 | 10 |
| D-351 | 100 | 0 | 50 | 70 | 3.0 | 1.38 | 10 |

Note:
*1)Ny: Poly-ε-caprolactam
*2)XD: Xylylene-containing polyamide

EXAMPLE 5

Using a mixture of 90% by weight of the same poly-ε-caprolactam in chip form as in Example 4 and 10% by weight of the same xylylene-containing polyamide in chip form, the film formation and the sequential biaxial stretching are effected by the aid of a larger sized film formation-stretching apparatus of the same type as in Table 7

| Item | Film of invention | Commercially available film |
|---|---|---|
| Thickness (μ) | 15 | 15 |
| Haze (%) | 1.2 | 1.7 |
| Tensile strength at break (kg/mm²) | 27.2 (MD) 31.5 (TD) | 22.1 (TD) 22.9 (TD) |
| Elongation at break (%) | 98 (MD) | 78 (MD) |

EXAMPLE 6

Using a mixture of 90% by weight of nylon 6.6 (chip of polyhexamethylene adipamide) and 10% by weight of the same chip of xylylene-containing polyamide as in Example 4, the film formation and the sequential biaxial stretching are effected by the aid of the same film formation-stretching apparatus as in Example 4 to obtain a film having a thickness of 15 μ which is subjected to heat treatment. The conditions in the film-formation and the stretching are as follows: temperature for melt extrusion of polymer, 285° C; temperature of chill roll, 20° C; temperature at stretching in machine direction, 65° C; draw ratio at stretching in machine direction, 3.5; temperature at stretching in transverse direction, 100° C; draw ratio at stretching in transverse direction, 3.7.

The plane orientation index of the film stretched in machine direction is 1.29. The break of film at the transverse stretching step is caused 3 times during 48 hours.

EXAMPLE 7

Poly-ε-caprolactam ($\eta_{rel}$ = 3.1) as the aliphatic polyamide and polyethylene glycol-containing polymetaxylylene adipamide (metazylylene diamine/paraxylylene diamine = 99/1 by mol; polyethylene glycol copolymerized in 2.5% by weight; $\eta_{rel}$ = 2.3) as the block polyetheramide are admixed in a chip state in a proportion as shown in Table 8. The mixture is heated at 280° C and melt-extruded by the aid of an extruder of 60 mm in diameter having a T-die onto a chill roll kept at a designed temperature as shown in Table 8 for cooling to obtain an unstretched film having a thickness of about 210 μ and a width of 25 cm. The unstretched film is then guided to a longitudinal stretching machine comprising multiple rolls being 110 mm in roll diameter and 700 mm in width at a velocity of 3 m/min and stretched in machine direction between the rolls with different peripheral speeds under the conditions shown in Table 8. Then, the film is guided into a transverse stretching tenter being about 3 m in width and about 11 m in lenght and stretched at 95° C in a direction vertical to the lengthwise direction of film with a proportion of 3.7. The plane orientation index of the film stretched in machine direction and the transverse stretchability are shown in Table 8.

From the results as shown in Tables 6 and 8, it is understood that the stretchability is improved by admixing poly-ε-caprolactam with the block polyetheramide and that an industrially adoptable stretchability can be obtained in the polyamide blend of the invention when the plane orientation index of the film stretched in machine direction is in the range of 0.6 to 1.5. The fact that the stretchability is improved by admixing with the block polyetheramide in spite of the equal value of the plane orientation index of the film stretched in machine direction in both cases of the aliphatic polyamide alone and the polyamide blend is probably attributable to decrease of the content of α-form crystals of the aliphatic polyamide. Especially in nylon 6, it is thinkable that incorporation of the block polyetheramide promotes the formation of γ-form crystals, and the content of α-form crystals is relatively reduced. Thus, in this latter polyamide blend, the presence of γ-form crystals of poly-ε-caprolactam which are not observed in a commercially available poly-ε-caprolactam film can be sometimes confirmed even in the film after sequential biaxial stretching.

Table 7-continued

| Item | Film of invention | Commercially available film |
|---|---|---|
| Young's modulus (kg/mm²) | 75 (TD) 204 (MD) 150 (TD) | 72 (TD) 214 (MD) 202 (TD) |
| Impact strength (kg.cm) | 12.5 | 7.2 |
| Oxygen permeability (cc/m².24 hr.atm) | 28 | 35 |

Note: MD, machine direction; TD, transverse direction.

Table 8

| No. | Mixing proportion of polymers | | Temperature of chill roll (° C) | Stretching in machine direction | | Plane orientation index | Stretch ability |
|---|---|---|---|---|---|---|---|
| | Ny*[1] | BA*[2] | | Temperature (° C) | Draw ratio | | |
| A-132 | 80 | 20 | 20 | 75 | 3.6 | 1.45 | 6 |
| A-121 | 80 | 20 | 20 | 65 | 3.0 | 1.04 | 1 |
| A-122 | 80 | 20 | 20 | 65 | 3.5 | 1.13 | 1 |
| A-123 | 80 | 20 | 20 | 65 | 4.0 | 1.35 | 4 |
| A-241 | 80 | 20 | 80 | 90 | 3.0 | 1.98 | More than 10 |
| B-132 | 90 | 10 | 20 | 75 | 3.5 | 1.60 | 8 |
| B-122 | 90 | 10 | 20 | 65 | 3.5 | 0.87 | 1 |
| B-112 | 90 | 10 | 20 | 55 | 3.5 | 0.82 | 3 |
| B-121 | 90 | 10 | 20 | 65 | 3.0 | 0.90 | 1 |
| B-123 | 90 | 10 | 20 | 65 | 4.0 | 0.96 | 0 |
| C-132 | 95 | 5 | 20 | 75 | 3.5 | 2.21 | More than 10 |
| C-122 | 95 | 5 | 20 | 65 | 3.5 | 0.89 | 2 |
| C-112 | 95 | 5 | 20 | 55 | 3.5 | 0.62 | 6 |
| C-121 | 95 | 5 | 20 | 65 | 3.0 | 1.02 | 0 |
| C-123 | 95 | 5 | 20 | 65 | 4.0 | 0.95 | 1 |

Note:
*[1] Ny: Poly-ε-caprolactam
*[2] BA: Block polyetheramide

EXAMPLE 8

Using a mixture of 90% by weight of the same poly-ε-caprolactam in chip form as in Example 7 and 10% by weight of the same block polyetheramide in chip form, the film-formation and the sequential biaxial stretching are effected by the aid of a larger sized film-formation-stretching apparatus of the same type as in Example 7 to obtain a film having a thickness of 15 μ which is subjected to heat treatment. The conditions in the film-formation and the stretching are as follows: temperature for melt extrusion of polymer, 285° C; temperature of chill roll, 20° C; temperature at stretching in machine direction, 65° C; draw ratio at stretching in machine direction, 3.5; temperature at stretching in transverse direction, 100° C; draw ratio at stretching in transverse direction, 3.7. The film after the transverse stretching is subjected to heat treatment in a tenter at 200° C for 15 seconds in a state of 7% relaxation in transverse direction. The running velocity of the film at the entrance of the longitudinal stretching machine is 17 m/min.

The plane orientation index of the film stretched in machine direction is 0.94. Break of film at the transverse stretching step is caused only one time during 48 hours. The physical properties of the thus obtained film are shown in Table 9 in comparison with those of the typical poly-ε-caprolactam film obtained by simultaneous biaxial stretching.

EXAMPLE 9

Using a mixture of 90% by weight of nylon 6.6 (chip of polyhexamethylene adipamide) and 10% by weight of the same chip of block polyetheramide as in Example 7, the film-formation and the sequential biaxial stretching are effected by the aid of the same film formation-stretching apparatus as in Example 7 to obtain a film having a thickness of 15 μ which is subjected to heat treatment. The conditions in the film-formation and the stretching are as follows: temperature for melt extrusion of polymer, 285° C; temperature of chill roll, 20° C; temperature at stretching in machine direction, 65° C; draw ratio at stretching in machine direction, 3.5; temperature at stretching in transverse direction, 100° C; draw ratio at stretching in transverse direction, 3.7.

The plane orientation index of the film stretched in machine direction is 1.24. The break of film at the transverse direction stretching step is caused 2 times during 48 hours.

Table 9

| Item | Film of invention | Commercially available film |
|---|---|---|
| Thickness (μ) | 15 | 15 |
| Haze (%) | 1.3 | 0.7 |
| Tensile strength at break (kg/mm$^2$) | 26.3 (MD) 29.3 (TD) | 22.1 (TD) 22.9 (TD) |
| Elongation at break (%) | 94 (MD) 79 (TD) | 78 (MD) 72 (TD) |
| Young's modulus (kg/mm$^2$) | 205 (MD) 167 (TD) | 214 (MD) 202 (TD) |
| Impact strength (kg.cm) | 12.1 | 7.2 |
| Oxygen permeability (cc/m$^2$.24 hr.atm) | 29 | 35 |

Note: MD, machine direction; TD, transverse direction.

What is claimed is:

1. A process for preparing a biaxially stretched film of polyamide blend which comprises extruding a polyamide blend in melt to make an unstretched film, stretching the unstretched film in a machine direction with a stretch speed of about 40,000 to 60,000,000%/minute in a draw ratio of about 2 to 6 to make a uniaxially stretched film having a plane orientation index of about 0.6 to 1.5 and then stretching the uniaxially stretched film in a transverse direction with a stretch speed of about 500 to 100,000%/minute in a draw ratio of about 2 to 6, said polyamide blend comprising:
   (1) an aliphatic polyamide and
   (2) a polyamide containing in the molecule at least about 70 mol % of the repeating units constituted with metaxylylenediamine or its mixture with paraxylylenediamine,
wherein when paraxylylenediamine is present, its amount is not more than about 30 mol % based on the combined amount of metaxylylenediamine or paraxylylenediamine and at least one α,ω-aliphatic dicarboxylic acid having 6 to 10 carbon atoms, said aliphatic polyamide and polyamide (2) being present in a proportion of about 97 : 3 to 80 : 20 by weight.

2. The process according to claim 1, wherein the thickness of the film is about 10 to 500 μ.

3. The process according to claim 1, wherein the aliphatic polyamide is an aliphatic polyamide selected from the group consisting of nylon 4, nylon 6, nylon 9, nylon 11, nylon 6.6, nylon 6.10 and nylon 10.10 and the copolymers comprising the monomeric constituents of those polymers, which forms α-form crystals.

4. The process according to claim 1, wherein the polyamide is a polymer selected from the group consisting of polymetaxylylene adipamide, polymetaxylylene pimelamide, polymetaxylylene suberamide, polymetaxylylene azelamide, polymetaxylylene sebacamide, metaxylylene/paraxylylene adipamide copolymer, metaxylylene/paraxylylene pimelamide copolymer, metaxylylene/paraxylylene suberamide copolymer, metaxylylene/paraxylylene azelamide copolymer and metaxylylene/paraxylylene sebacamide copolymer, and a block polyetheramide constituted with metaxylylenediamide or its mixture with paraxylylenediamine having a paraxylylenediamine content of not more than about 30 mol % as the diamine component, an α,ω-aliphatic dicarboxylic acid having 6 to 10 carbon atoms as the dicarboxylic acid component and a polyether residue having a molecular weight of about 2,000 to 20,000, the polyether content being about 0.2 to 10% by weight based on the combined amount of the diamine and dicarboxylic acid components and the polyester.

5. The process according to claim 4, wherein the block polyetheramide is a copolymer constituted with the monomeric constituents of a polyamide and the residue of a polyether having a molecular weight of about 2,000 to 20,000, said polyamide being a member selected from the group consisting of polymetaxylylene adipamide, polymetaxylylene pimelamide, polymetaxylylene suberamide, polymetaxylylene azelamide, polymetaxylylene sebacamide, metaxylylene/paraxylylene adipamide copolymer, metaxylylene/paraxylylene pimelamide copolymer, metaxylylene/paraxylylene suberamide copolymer, metaxylylene/paraxylylene azelamide copolymer and metaxylylene/paraxylylene sebacamide copolymer and the polyether content in the copolymer being about 0.2 to 10% by weight based on the combined amount of the polyamide and the polyether.

6. The process according to claim 5, wherein the polyether is polyethylene oxide.

7. The process according to claim 1, wherein the temperature at the stretching in machine direction is above the glass transition point and below about 130° C and the temperature at the stretching in transverse direction is higher than the temperature at the stretching in machine direction and lower than about 160° C.

8. The process according to claim 1, wherein the biaxially stretched film is further subjected to heat treatment at a temperature not less than about 5° C higher than the higher temperature of the temperatures at the stretching in machine and transverse directions but lower than the melting point of the film.

* * * * *